United States Patent
Cleve et al.

(10) Patent No.: US 8,249,753 B2
(45) Date of Patent: Aug. 21, 2012

(54) METHOD FOR OPERATING A WIND FARM COMPRISING A PLURALITY OF WIND TURBINES

(75) Inventors: Jochen Cleve, København (DK); Per Egedal, Herning (DK); Peder Bay Enevoldsen, Vejle (DK); Martin Greiner, Neukeferloh (DE); Søren Hjort, Brande (DK); Esther Meyer, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 12/600,095

(22) PCT Filed: Apr. 28, 2008

(86) PCT No.: PCT/EP2008/055186
§ 371 (c)(1),
(2), (4) Date: Sep. 16, 2010

(87) PCT Pub. No.: WO2008/138738
PCT Pub. Date: Nov. 20, 2008

(65) Prior Publication Data
US 2011/0006525 A1    Jan. 13, 2011

(30) Foreign Application Priority Data
May 15, 2007    (DE) .......................... 10 2007 022 705

(51) Int. Cl.
*G05D 3/12*    (2006.01)
*F03D 9/00*    (2006.01)

(52) U.S. Cl. .................. 700/286; 700/287; 290/44
(58) Field of Classification Search .............. 700/286, 700/287, 297; 290/44
See application file for complete search history.

(56) References Cited

U.S. PATENT DOCUMENTS

| | | | |
|---|---|---|---|
| 5,305,230 A * | 4/1994 | Matsumoto et al. | 700/287 |
| 2006/0232073 A1 | 10/2006 | Corten et al. | |
| 2007/0090651 A1 | 4/2007 | Wobben | |
| 2008/0001409 A1 * | 1/2008 | Schellings | 290/44 |
| 2011/0140420 A1 * | 6/2011 | Loh et al. | 290/44 |

FOREIGN PATENT DOCUMENTS

| | | |
|---|---|---|
| DE | 102006014121 A1 | 12/2006 |
| DE | 102005033229 A1 | 1/2007 |
| EP | 1672778 A2 | 6/2006 |
| EP | 1739824 A2 | 1/2007 |
| JP | 2002349413 A | 12/2002 |
| WO | WO 03008802 A1 | 1/2003 |

OTHER PUBLICATIONS

Communication From Japanese Patent Office, Feb. 17, 2012, pp. 1-4.

* cited by examiner

*Primary Examiner* — Sean Shechtman

(57) ABSTRACT

A method and a device for operating a wind farm with a plurality of wind turbines are provided. According to the method, operating parameters of the wind turbines of the wind farm are adjusted according to an optimization goal, the optimization goal being the maximum value of the total output of the wind farm produced from the sum of all individual outputs of the wind turbines. The optimization goal differs from conventional optimization goals where the respective individual outputs of the wind turbines are optimized without taking the overall output into consideration.

17 Claims, 2 Drawing Sheets

METHOD FOR OPERATING A WIND FARM COMPRISING A PLURALITY OF WIND TURBINES

CROSS REFERENCE TO RELATED APPLICATIONS

This application is the US National Stage of International Application No. PCT/EP2008/055186 filed Apr. 28, 2008, and claims the benefit thereof. The International Application claims the benefits of German Application No. 10 2007 022 705.3 DE filed May 15, 2007. All of the applications are incorporated by reference herein in their entirety.

FIELD OF INVENTION

The invention relates to a method and to a device for operating a wind farm comprising a plurality of wind turbines.

BACKGROUND OF INVENTION

In wind farms kinetic wind energy is converted into electrical power with the aid of wind turbines in the form of windmills. In the case of conventional wind farms the individual outputs of the individual wind turbines is detected and operating parameters of the wind turbines, in particular the angle of inclination of the rotor blades of the individual turbines, are adjusted in such a way that each individual output is individually optimized, i.e. exhibits a maximum value in the case of predefined wind conditions.

From document DE 10 2005 033 229 A1 a network for controlling wind turbines is known, sensors being provided on the wind turbines for measuring purposes and the sensor values of a wind turbine being transmitted via an appropriate network to other wind turbines. Operating parameters, for example the adjustment of the inclination of the rotor blades, can be controlled using the sensor values.

Known methods for operating a wind farm control the operating parameters of the individual wind turbines independently of each other without checking whether the adjustment of the operating parameters of each individual wind turbine to a maximum output value also actually generates the best total output of the wind farm.

SUMMARY OF INVENTION

The object of the invention is therefore to create a method for operating a wind farm with which the output total electrical power of the wind farm is improved.

This object is achieved by the independent claims. Developments of the invention are defined in the dependent claims.

In the inventive method operating parameters of the wind turbines on the wind farm are adjusted during operation of the wind farm according to an optimization goal, the optimization goal being the maximum value of the total output of the wind farm produced from the sum of all individual outputs of the wind turbines. This optimization goal is not known for wind farms. In wind farms according to the prior art an individual optimization of the individual outputs of the wind turbines is always made without taking account of the fact that an improved total output can possibly still be attained by non-optimal adjustment values of individual wind turbines.

The invention is based in particular on the finding that the individual wind turbines in wind farms interact and in particular the slipstream of one wind turbine affects the wind conditions of the wind turbine located therebehind. According to the invention it has been found that as a result of these interactions the best total output of a wind farm is achieved not by adjusting the individual operating parameters of the wind turbines to a maximum value of the individual outputs, rather better total output values are achieved if optimization takes place with regard to the maximum value of the sum of all individual outputs.

In a preferred embodiment of the inventive method the operating parameters, which are adjusted according to the optimization goal, incorporate the respective angles of inclination of the rotor blades of the individual wind turbines. The angles of inclination of the rotor blades determine the slipstream of the individual wind turbines and are therefore the preferred parameter via which changes in the total output of the wind farm can be attained.

In a further embodiment of the inventive method the respective individual outputs of the wind turbines is detected during operation of the wind farm and the angles of inclination of the rotor blades are adjusted in response to the detected individual outputs and according to the optimization goal. Particularly good real operation of the wind farm is ensured with this method as the individual outputs that really exist are also always considered when adjusting the optimization goal. Better results can be attained hereby than if the optimization goal is only established by theoretical calculations without consideration of real operation.

In a further embodiment of the inventive method the optimization goal is given by an optimization of the wind speed ratios of the wind turbines, the wind speed ratio of a respective wind turbine being given by the ratio of the central wind speed (i.e. the wind speed in the center of the rotor of the respective wind turbine) immediately downstream of the respective wind turbine to the central wind speed immediately upstream of the respective wind turbine. The wind speed ratio of a respective wind turbine is preferably adjusted via the angle of inclination of the rotor blades of the respective wind turbine, the dependence of the angle of inclination on the wind speed ratio being known in advance for each wind turbine, or it being possible to easily determine this.

In a preferred embodiment of the inventive method a linear wind farm is operated which comprises one or more parallel rows of, in particular structurally identical, wind turbines arranged one behind the other. In the case of this kind of wind with a predefined wind speed parallel to the rows of wind turbines arranged one behind the other, the optimization goal is given by the maximum outputs of the rows of wind turbines arranged one behind the other. This takes account of the fact that in the case of a wind inclined parallel to the rows, there is no influencing of the wind turbines by different rows, so for each row an optimization can be made individually with regard to the maximum output of all wind turbines in the row.

In a further embodiment of the inventive method the maximum output of a respective row of wind turbines arranged one behind the other is determined by optimization of the wind speed ratios of the respective wind turbines of a row according to the following equation:

$$\{q_i\}_{opt} = \mathrm{argmax}\left(\sum_{i=1}^{N} P_i(q_i \mid v_i)\right)$$

where N is the number of wind turbines in a row and the wind turbines in a row are numbered in ascending order in the wind direction;

where $q_i$ is the ratio of the central wind speed immediately downstream of the i-th wind turbine to the central wind speed $v_i$ immediately upstream of the i-th wind turbine;

where $P_i(q_i|v_i)$ is the individual output of the i-th wind turbine as a function of the wind speed ratio $q_i$ in the case of a given central wind speed $v_i$ immediately upstream of the i-th wind turbine.

The output $P_i(q_i|v_i)$ is preferably given by the following equation in this case:

$$P_i(q_i \mid v_i) = \frac{\rho}{2}\pi R^2 v_i^3 \frac{(1+q_i)(1-q_i^2)}{2}$$

where $\rho$ is the air density and R the radius of the rotor of the i-th wind turbine and where $v_i$ is the central wind speed immediately upstream of the i-th wind turbine.

The above correlation has been known for a long time to a person skilled in the art of wind generation and can be used in the inventive method for determining the individual output $P_i$ of a turbine with the aid of a computer.

In a particularly preferred embodiment of the inventive method the central wind speed $v_i$ immediately upstream of the i-th wind turbine is determined with the aid of the following formula:

$$\pi((R+x\tan\alpha)^2-R^2)v^*_{i-1}+\pi R^2 q_{i-1}v_{i-1}=\pi(R+x\tan\alpha)^2 v_i, (i\geq 2)$$

where R is the radius of the rotor of the (i−1)th wind turbine;
where x is the spacing of the (i−1)th wind turbine from the i-th wind turbine;
where $v^*_{i-1}$ is the peripheral speed at the edge of the rotor (RO) of the (i−1)th wind turbine;
where $\alpha$ is the angle of inclination of the slipstream of the (i−1)th wind turbine.

The angle of inclination $\alpha$ is a variable that is strictly predefined for a respective wind turbine.

The above-defined peripheral wind speed $v^*_{i-1}$ is estimated in this case by a value which lies between the central wind speed $v^*_{i-1}$ immediately upstream of the center of the rotor of the (i−1)th wind turbine and the central wind speed $v_1$ immediately upstream of the center of the rotor of the first wind turbine.

In a further preferred embodiment of the invention the operating parameters are determined according to the optimization goal with the aid of a numerical method, in particular a gradient method.

In one embodiment of the inventive method the operating parameters are predefined according to the optimization goal for a predefined number of reference wind conditions. Artificial intelligence is preferably used when adjusting the operating parameters, in particular in the form of an artificial neuronal network and/or a probabilistic network (for example a Bayesian network). The artificial neuronal network and/or the probabilistic network are learned in this case with the operating parameters for the predefined number of reference wind conditions. Optimal operating parameters for a maximum total output of the wind farm can thus always be calculated with the method for any wind conditions that differ from the reference conditions.

In addition to the above-described method the invention also includes a device for operating a wind farm comprising a plurality of wind turbines, the device incorporating a control unit with which operating parameters of the wind turbine can be adjusted as a function of an optimization goal, the optimization goal being the maximum value of the total output of the wind farm produced from the sum of all individual outputs of the wind turbines. This device is preferably configured in such a way that operation of the wind farm is possible according to any variant of the above-described inventive method.

In a preferred embodiment the inventive device comprises a network, in particular a wired and/or wireless network, via which the control unit is connected to the wind turbines, control commands for adjusting the operating parameters of the wind turbines being transmitted to the wind turbines via the network. Values of the individual outputs of the wind turbines can preferably also be communicated to the control unit via the network.

The invention also relates to a wind farm comprising a plurality of wind turbines and which includes the device just described for operating the wind farm.

BRIEF DESCRIPTION OF THE DRAWINGS

Exemplary embodiments of the invention will be described hereinafter with reference to the accompanying figures, in which.

DETAILED DESCRIPTION OF INVENTION

Figure 1:
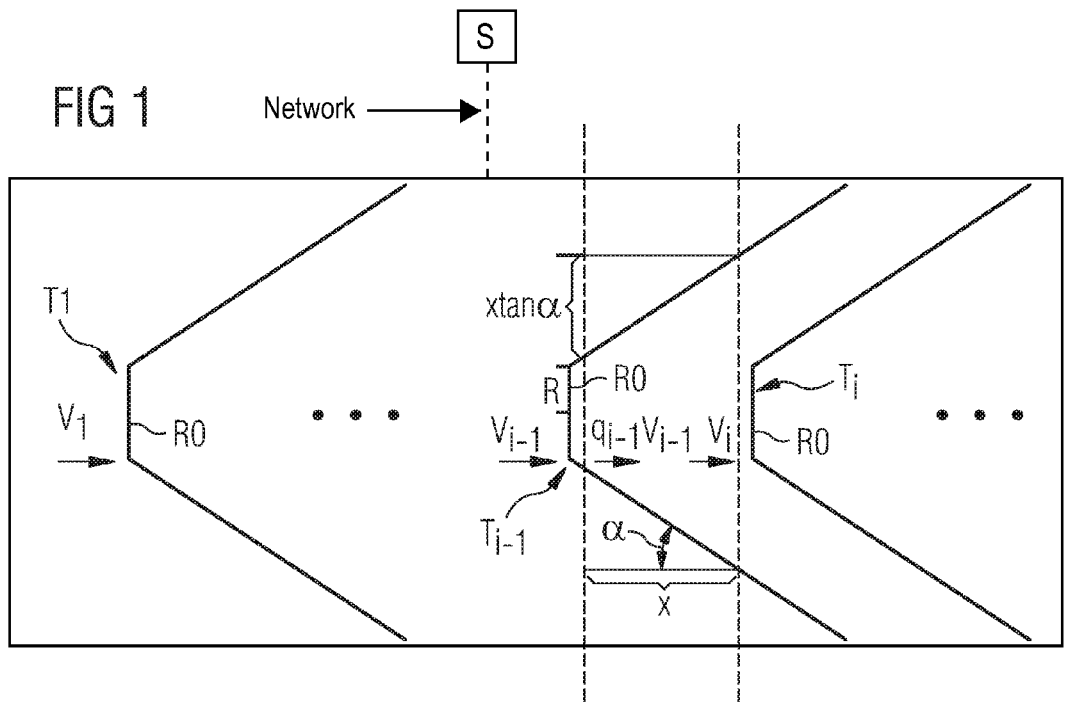
FIG. 1 shows a schematic diagram of a linear wind farm comprising wind turbines arranged one behind the other and which is operated using an embodiment of the inventive method.

FIG. 1 shows a schematic plan view of a wind farm comprising a large number of wind turbines $T_1, \ldots, T_{i-1}, T_i, \ldots$ in the form of individual, structurally identical generator turbines, which are spaced apart from each other by a constant spacing x and are driven by a corresponding frontal wind at speed $v_1$. The direction of the wind is perpendicular to the extent of the rotors RO formed by the plurality of rotor blades in this case, the radius of the individual rotor blades being designated R. The angle of inclination $\alpha$ of the slipstream downstream of the turbine $T_{i-1}$ is also shown in FIG. 1. The region of the slipstream which is outside of the cross-section of the rotor RO results in this case from the spacing x between the adjacent turbines $T_{i-1}$ and $T_i$ and covers the radial section $x\tan\alpha$.

In the diagram of FIG. 1 the stream immediately upstream of the (i−1)th turbine or the i-th turbine is designated $v_{i-1}$ or $v_i$. The stream immediately downstream of the (i−1)th turbine is designated $q_{i-1}v_{i-1}$ moreover. The parameter $q_i$ (i=1, ..., N) therefore represents the ratio of the wind speed directly downstream and directly upstream of the i-th turbine. This ratio $q_i$ can be controlled via the appropriate angle of inclination of the rotor blades of a turbine.

As already illustrated in the aforegoing, operating parameters of the individual turbines are adjusted as a function of an optimization goal in such a way that the total electrical output, which represents the sum of the individual outputs of all turbines, is maximal. In the embodiment of the invention described here the angle of inclination of the rotor blades is used as the operating parameter, and this can be appropriately changed via suitable motors on the rotor blades.

The optimization goal will hereinafter be represented by optimized wind speed ratios $q_i$, where $q_i$ in turn depends on the angle of inclination of the rotor blades. The optimal values for $q_i$ are calculated by a mathematical optimization method. Therefore, optimized wind speed ratios $q_i$ can be calculated in advance using numerical simulations, and herefrom optimized angles of inclination of the rotor blades for different frontal speeds $v_i$, so the optimized angles of inclination are then optimally adjusted in real operation of the wind farm as a function of the given wind speed $v_i$. A corresponding control unit S is provided for this purpose, and is preferably provided with artificial intelligence in order to determine optimized angles of inclination even for new wind speeds for which no optimized angles of inclination have been determined in advance. This artificial intelligence can be foamed in particular by neuronal networks or by probabilistic networks, such as Bayesian networks, these networks being learned with optimal angles of inclination and associated individual outputs of the turbines.

In the embodiment of the inventive method described here the following correlation, based on Bernoulli's equation, between physical variables of the turbines of a wind farm is used:

$$\pi((R+x\tan\alpha)^2 - R^2)v^*_{i-1} + \pi R^2 q_{i-1} v_{i-1} = \pi(R + x\tan\alpha)^2 v_i, (i \geq 2) \quad (1)$$

As already illustrated, R is the radius of the corresponding rotor blade of a turbine, x the spacing between two adjacent turbines and α the angle of inclination of the slipstream. $v_i$ and $v_{i-1}$ represent the central wind speeds (i.e. the speeds in the center of the respective rotor), moreover, directly upstream of the turbines $T_i$ and/or $T_{i-1}$. $q_{i-1}v_{i-1}$ represents the central wind speed directly downstream of the turbine $T_{i-1}$. $v^*_{i-1}$ describes the wind speed at the outer edge of the rotor of the turbine $T_{i-1}$, where the following two estimates are used for $v^*_{i-1}$:

$$v^*_{i-1} = \begin{cases} v_i & (upperestimation) \\ v_{i-1} & (lowerestimation) \end{cases} \quad (2)$$

In the case of the lower estimation it is assumed that the speed $v^*_{i-1}$ at the edge of the rotor is as great as the speed $v_{i-1}$ in the center of the rotor immediately upstream of the turbine $T_{i-1}$. This estimation is valid for small spacings x between individual turbines. In the case of the upper estimation it is assumed that the wind speed $v^*_{i-1}$ at the edge of the rotor has already accelerated to the frontal wind speed $v_i$ again. The lower estimation applies to wind farms with large spacings x of individual turbines from one another. The value of $v^*_{i-1}$ is therefore chosen between $v_{i-1}$ and $v_i$ as a function of the configuration of the wind farm in such a way that best reproduces the real conditions. Using the upper and lower estimation of $v^*_{i-1}$ the following speeds $v_i$ immediately upstream of the center of the rotor of the i-th wind turbine can be determined as follows by using equation (1):

$$v_i = \begin{cases} v_1\left(1 - \left(1 - q_{i-1}\frac{v_i-1}{v_1}\right)\left(\frac{R}{R+x\tan\alpha}\right)^2\right) & (upperestimation) \\ v_{i-1}\left(1 - (1-q_{i-1})\left(\frac{R}{R+x\tan\alpha}\right)^2\right) & (lowerestimation) \end{cases} \quad (3)$$

Using a formula that has been known for a long time to a person skilled in the art for describing the individual output $P_i$ of the turbine $T_i$, this individual output $P_i$, can be described as a function of the speed $v_i$ and the speed ratio $q_i$ as follows:

$$P_1 = \frac{\rho}{2}\pi R^2 v_i^3 \frac{(1+q_i)(1-q^2)}{2}. \quad (4)$$

In equation (4) ρ represents the air density and the coefficient $C(q) = (1+q)(1-q^2)/2$ assumes the maximum value in the case of q=⅓. This represents the known conventional result for optimization of the respective individual outputs of the turbines in a wind farm. With this result the wind speed v upstream of the turbine is decelerated to v/3 downstream of the turbine. The total output generated by the wind farm results as follows herefrom by selecting $q_i=⅓$, i=1, ..., N for all turbines:

$$P_{tot}(q_i = 1/3, i = 1 : N | v_i) = \sum_{i=1}^{N} P_i(q_i = 1/3 | v_i). \quad (5)$$

The total output according to equation (5) constitutes an optimization of the individual outputs of the turbines without mutual interaction of the streams generated by the turbines being taken into account. The total output is therefore a "self-serving" optimization for each individual turbine and a result determined on the basis of this optimization will be called a reference optimization hereinafter. According to the invention it has been found that this reference optimization does not provide the best total output of the sum of all individual outputs of the turbines and instead an optimization has been used in which the total output of all individual turbines is optimized as the optimization goal. This takes account of the fact that the streams of the individual turbines interact, so the maximum total output cannot be determined simply by the fact that the maximums of all individual outputs of the turbines are ascertained.

According to the invention the optimum set of wind speed ratios $q_i$(i=1, ..., N) of N turbines is sought, it being possible to mathematically illustrate this optimum set as follows:

$$\{q_i\}_{opt} = \text{argmax}\left(\sum_{i=1}^{N} P_i(q_i | v_i)\right). \quad (60)$$

Here $P_i(q_i|v_i)$ is the individual output of the i-th turbine for a wind speed ratio $q_i$ under the condition of the central speed value $v_i$ immediately upstream of the turbine $T_i$.

Figure 2:
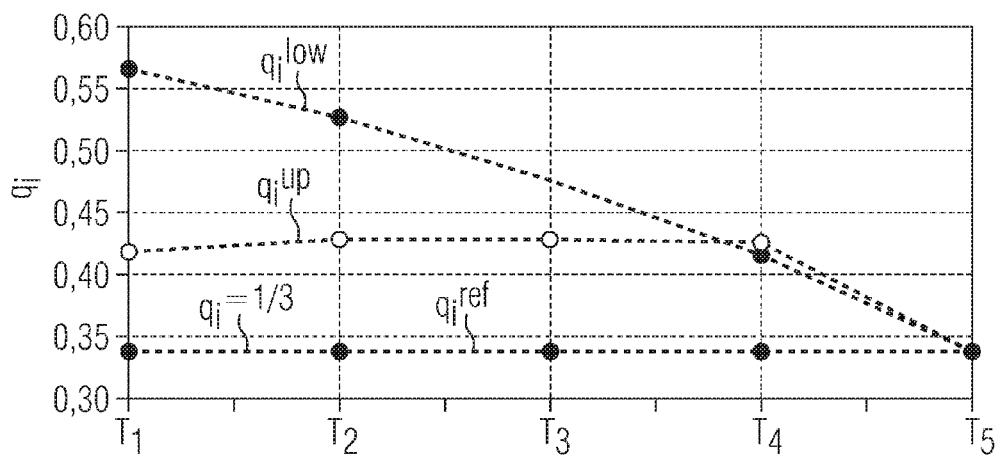
FIG. 2 shows a graph which, for a linear wind farm comprising five wind turbines arranged one behind the other, depicts the adjustments of wind speed ratios of the individual wind turbines on the basis of a method according to the prior art and on the basis of two inventive embodiments of operating methods.

In one embodiment of the inventive method a quasi Newton optimization method was used for the wind farm in FIG. 1 to determine optimum values for $q_i$, a wind farm with N=5 turbines arranged one behind the other with equidistant spacing x/R=20 and tan α=0.1 having been considered. As the slipstream of the last turbine $T_N$ does not affect any further turbines the optimum value for the individual output of this turbine results for the speed ratio $q_N$, namely $q_N=⅓$. For all other turbines i=1: N−1 the corresponding wind speed ratios are $q_i > ⅓$, i.e. these ratios are always greater than in the reference optimization. FIG. 2 shows a graph which illustrates the individual optimized values $q_i$ of the turbines $T_1$ to $T_5$ for the reference optimization and for the optimization according to equation (6), wherein on the one hand the upper estimation $v^*_{i-1}=v_i$ (designated $q_i^{up}$ in FIG. 2) and on the other hand the lower estimation have been used for $v^*_{i-1}=$ $V_{i-1}$ (designated $q_i^{low}$ in FIG. 2). The reference optimization is designated $q_i^{ref}$. As already illustrated, $q_i=\frac{1}{3}$ applies for all values $q_i$ of the individual turbines in the case of the reference optimization. By contrast, the values for $q_i$ are always greater than ⅓ for the optimizations according to equation (6); only the final value for turbine $T_5$ matches the value ⅓ again.

Figure 3:
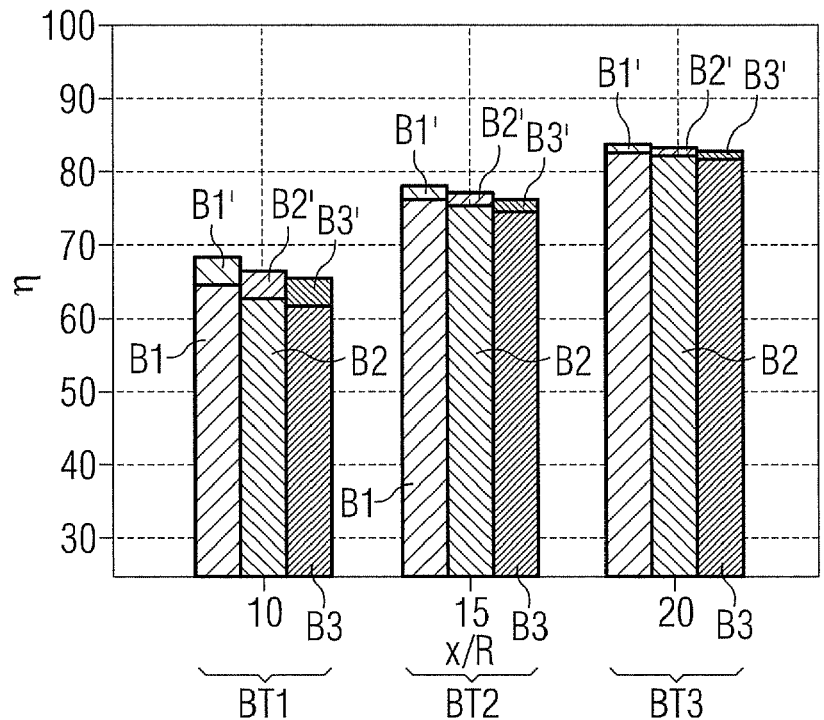
FIGS. 3 and 4 show graphs which, for two embodiments of the inventive method, compare the efficiencies of the inventive method with a method according to the prior art in each case.
Figure 4:
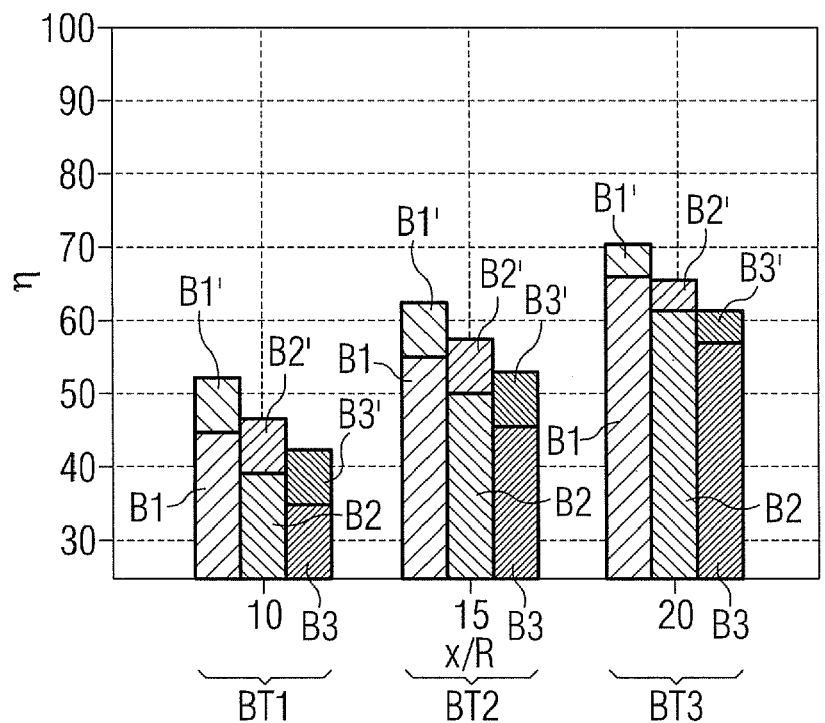

FIGS. 3 and 4 show the calculated efficiencies of linear wind farms with different numbers of turbines, the efficiency η being given by the following formula:

$$\eta = P_{tot}(q_i, i=1:N|v_i)/(NP(q=\frac{1}{3}|v_1)) \quad (7).$$

From formula (7) it emerges that the efficiency η is represented by the total output of the turbines in the wind farm divided by the sum of the individual turbines in the wind farm, provided that all turbines are operated with full frontal wind $v_1$ and each turbine is adjusted to the wind speed ratio $q=\frac{1}{3}$.

In FIGS. 3 and 4 the efficiencies determined with the reference optimization are respectively compared with the efficiencies determined according to the invention for both the upper estimation $v^*_{i-1}=v_i$ and for the lower estimation $v^*_{i-1}=v_{i-1}$. FIG. 3 depicts the results for the upper estimation and FIG. 4 the results for the lower estimation. Three triplets BT1, BT2 and BT3 consisting of bars can be seen in FIGS. 3 and 4, each triplet representing a corresponding ratio x/R. In particular x/R=10 applies for triplet BT1, x/R=15 for triplet BT2 and x/R=20 for triplet BT3. The left-hand bars $B_1$ and $B_1'$ in a respective triplet show the efficiency for the reference optimization and for the optimization according to equation (6) for a wind farm with N=5 turbines. The middle bars $B_2$ and $B_2'$ in a respective triplet show the efficiency for the reference optimization and for the optimization according to equation (6) for a wind farm with N=6 turbines. The right-hand bars $B_3$ and $B_3'$ in a respective triplet show the efficiency for the reference optimization and for the optimization according to equation (6) for a wind farm with N=7 turbines. As can be seen from FIGS. 3 and 4, the efficiencies which have been determined according to the invention according to equation (6), i.e. the efficiencies according to bars $B_1'$, $B_2'$ and $B_3'$, are always better than the corresponding efficiencies according to the conventional reference optimization which are depicted by bars $B_1$, $B_2$ and $B_3$. This improvement is particularly great in FIG. 4 when using the lower estimation $v^*_{i-1}=v_{i-1}$. According to the simulated results in FIGS. 3 and 4 it should therefore be assumed that in real operation of a wind farm clear increases in efficiency will result if the operating parameters of the individual turbines are adjusted with regard to maximization of the total output of all turbines.

As emerges from FIGS. 3 and 4, an improvement in the total output by several percent can be achieved with the inventive method. In the case of a wind farm with 50 wind turbines with an output of 2.3 megawatts respectively, which currently generates about 500 gigawatt hours per year, an additional profit of 500,000 euros is achieved with an increase in output power of just 1%.

The invention claimed is:

1. A method for operating a wind farm with a plurality of wind turbines, comprising:
   adjusting operating parameters of the wind turbines during operation of the wind farm according to an optimization goal,
   wherein the optimization goal is a maximum value of a total output of the wind farm produced from a sum of all individual outputs of the wind turbines,
   wherein the optimization goal is given by an optimization of wind speed ratios of the wind turbines, a wind speed ratio of a respective wind turbine being given by a ratio of a central wind speed immediately downstream of the respective wind turbine to a central wind speed immediately upstream of the respective wind turbine,
   wherein the wind speed ratio of the respective wind turbine is adjusted using an angle of inclination of rotor blades of the respective wind turbine, and
   wherein the optimization of wind speed ratios of the wind turbines is determined according to the following equation:

$$\{q_i\}_{opt} = \arg\max\left(\sum_{i=1}^{N} P_i(q_i \mid v_i)\right)$$

wherein N is the number of wind turbines in a row and the wind turbines in a row are numbered in ascending order in the wind direction,
   wherein $q_i$ is the ratio of the central wind speed immediately downstream of the i-th wind turbine to the central wind speed $v_i$ immediately upstream of the i-th wind turbine, and
   wherein $P_i(q_i|v_i)$ is the individual output of the i-th wind turbine as a function of the wind speed ratio $q_i$ in the case of a given central wind speed $v_i$ immediately upstream of the i-th wind turbine.

2. The method as claimed in claim 1, wherein the operating parameters incorporate respective angles of inclination of rotor blades of the individual wind turbines.

3. The method as claimed in claim 2, wherein respective individual outputs of the wind turbines are detected during operation of the wind farm and the angles of inclination of the rotor blades are adjusted in response the detected individual outputs and according to the optimization goal.

4. The method as claimed in claim 1, wherein the wind farm is a linear wind farm comprising one or more parallel rows of structurally identical wind turbines arranged one behind the other.

5. The method as claimed in claim 4, wherein the optimization goal in case of a predefined wind speed parallel to the rows of wind turbines arranged one behind the other is given by the maximum outputs of the rows of wind turbines arranged one behind the other.

6. The method as claimed in claim 1, wherein $P_i(q_i|v_i)$ is given by the following equation:

$$P_i(q_i \mid v_i) = \frac{\rho}{2}\pi R^2 v_i^3 \frac{(1+q_i)(1-q^2)}{2}$$

wherein ρ is the air density and R the radius of the rotor of the i-th wind turbine, and
   wherein $v_i$ is the central wind speed immediately upstream of the i-th wind turbine.

7. The method as claimed in claim 6, wherein the central wind speed $v_i$ immediately upstream of the i-th wind turbine is determined by the following formula:

$$\pi((R+x\tan\alpha)^2 - R^2)v^*_{i-1} + \pi R^2 q_{i-1} v_{i-1} = \pi(R+x\tan\alpha)^2 v_i, \quad (i \geq 2)$$

wherein R is the radius of the rotor (RO) of the (i−1)th wind turbine,
   wherein x is the spacing of the (i−1)th wind turbine from the i-th wind turbine,
   wherein $v^*_{i-1}$ is the peripheral wind speed at the edge of the rotor (RO) of the (i−1)th wind turbine, and
   wherein α is the angle of inclination of the slipstream of the (i−1)th wind turbine.

8. The method as claimed in claim 7, wherein the peripheral wind speed $v^*_{i-1}$ is estimated by a value which lies between the central wind speed $v^*_{i-1}$ immediately upstream of the (i−1)th wind turbine and the central wind speed $v_{i-1}$ immediately upstream of the first wind turbine.

9. The method as claimed in claim 1, wherein the operating parameters according to the optimization goal are determined by a numerical method.

10. The method as claimed in claim 9, wherein the numerical method is a gradient method.

11. The method as claimed in claim 1, wherein the operating parameters are predefined according to the optimization goal for a predefined number of reference wind conditions.

12. The method as claimed in claim 11, wherein the operating parameters are adjusted based upon an artificial neuronal network and/or a probabilistic network, which are learned with the aid of the operating parameters for the predefined number of reference wind conditions.

13. A device for operating a wind farm with a plurality of wind turbines, comprising:
a control unit for adjusting operating parameters of the wind turbines as a function of an optimization goal,
wherein the optimization goal is the maximum value of a total output of the wind farm produced from a sum of all individual outputs of the wind turbines,
wherein the optimization goal is given by an optimization of wind speed ratios of the wind turbines, a wind speed ratio of a respective wind turbine being given by a ratio of a central wind speed immediately downstream of the respective wind turbine to a central wind speed immediately upstream of the respective wind turbine,
wherein the wind speed ratio of the respective wind turbine is adjusted using an angle of inclination of rotor blades of the respective wind turbine, and
wherein the optimization of wind speed ratios of the wind turbines is determined according to the following equation:

$$\{q_i\}_{opt} = \arg\max\left(\sum_{i=1}^{N} P_i(q_i|v_i)\right)$$

wherein N is the number of wind turbines in a row and the wind turbines in a row are numbered in ascending order in the wind direction,
wherein $q_i$ is the ratio of the central wind speed immediately downstream of the i-th wind turbine to the central wind speed $v_i$ immediately upstream of the i-th wind turbine, and
wherein $P_i(q_i|v_i)$ is the individual output of the i-th wind turbine as a function of the wind speed ratio $q_i$ in the case of a given central wind speed $v_i$ immediately upstream of the i-th wind turbine.

14. The device as claimed in claim 13, further comprising:
a network, the control unit being connected via the network to the wind turbines,
wherein control commands for adjusting the operating parameters of the wind turbines are transmitted to the wind turbines via the network.

15. The device as claimed in claim 14, wherein the network is a wireless network.

16. The device as claimed in claim 14, wherein values of the individual outputs of the wind turbines are communicated to the control unit via the network.

17. A wind farm, comprising:
a plurality of wind turbines; and
a device for operating the wind farm, the device comprising:
a control unit for adjusting operating parameters of the wind turbines as a function of an optimization goal,
wherein the optimization goal is the maximum value of a total output of the wind farm produced from a sum of all individual outputs of the wind turbines,
wherein the optimization goal is given by an optimization of wind speed ratios of the wind turbines, a wind speed ratio of a respective wind turbine being given by a ratio of a central wind speed immediately downstream of the respective wind turbine to a central wind speed immediately upstream of the respective wind turbine,
wherein the wind speed ratio of the respective wind turbine is adjusted using an angle of inclination of rotor blades of the respective wind turbine, and
wherein the optimization of wind speed ratios of the wind turbines is determined according to the following equation:

$$\{q_i\}_{opt} = \arg\max\left(\sum_{i=1}^{N} P_i(q_i|v_i)\right)$$

wherein N is the number of wind turbines in a row and the wind turbines in a row are numbered in ascending order in the wind direction,
wherein $q_i$ is the ratio of the central wind speed immediately downstream of the i-th wind turbine to the central wind speed $v_i$ immediately upstream of the i-th wind turbine, and
wherein $P_i(q_i|v_i)$ is the individual output of the i-th wind turbine as a function of the wind speed ratio $q_i$ in the case of a given central wind speed $v_i$ immediately upstream of the i-th wind turbine.

* * * * *